United States Patent
Riley (10) Patent No.: US 10,101,987 B2
(45) Date of Patent: Oct. 16, 2018

(54) METHOD AND SYSTEM OF PROCESSING AN IMAGE UPGRADE

(71) Applicant: Echelon Corporation, Santa Clara, CA (US)

(72) Inventor: Glen M. Riley, Saratoga, CA (US)

(73) Assignee: Echelon Corporation, Santa Clara, CA (US)

( * ) Notice: Subject to any disclaimer, the term of this patent is extended or adjusted under 35 U.S.C. 154(b) by 0 days.

(21) Appl. No.: 14/644,484

(22) Filed: Mar. 11, 2015

(65) Prior Publication Data

US 2016/0266887 A1    Sep. 15, 2016

(51) Int. Cl.
| | |
|---|---|
| G06F 9/45 | (2006.01) |
| G06F 8/65 | (2018.01) |
| H04L 12/24 | (2006.01) |
| G06F 8/61 | (2018.01) |
| H04L 29/08 | (2006.01) |

(52) U.S. Cl.
CPC .................. *G06F 8/65* (2013.01); *G06F 8/63* (2013.01); *H04L 41/082* (2013.01); *H04L 67/1095* (2013.01); *H04L 67/34* (2013.01)

(58) Field of Classification Search
CPC ................................................ G06F 8/60–8/68
See application file for complete search history.

(56) References Cited

U.S. PATENT DOCUMENTS

| | | | | |
|---|---|---|---|---|
| 8,713,515 B1* | 4/2014 | Biggerstaff | ............... | G06F 8/72 717/104 |
| 8,832,428 B2* | 9/2014 | Ota | ...................... | H04W 12/04 713/153 |
| 8,849,717 B2* | 9/2014 | Cooper | ................... | G06F 21/12 705/51 |
| 8,856,323 B2* | 10/2014 | Enns | ................. | H04L 29/08729 709/202 |
| 9,014,183 B2* | 4/2015 | Foo | ......................... | H04L 67/06 370/389 |
| 9,092,300 B2* | 7/2015 | Wojcik | ...................... | G06F 8/71 |
| 9,152,794 B1* | 10/2015 | Sanders | ................ | G06F 21/575 |
| 9,241,270 B1* | 1/2016 | Logue | ................... | H04W 12/06 |
| 2004/0215755 A1* | 10/2004 | O'Neill | ..................... | G06F 8/65 709/223 |

(Continued)

FOREIGN PATENT DOCUMENTS

WO    03009136 A1    1/2003

OTHER PUBLICATIONS

European Search Report for corresponding application No. 15203258. 7-1502, dated Jun. 7, 2016, 8 pages.

*Primary Examiner* — Matthew J Brophy
(74) *Attorney, Agent, or Firm* — Nicholson De Vos Webster & Elliott LLP (57) ABSTRACT

Embodiments of the invention include methods, apparatuses, and systems for processing an image update in a networkable node. An exemplary method comprises initiating an image update process with a node, transmitting an update image to the node, transmitting a confirmation request to determine the node received the update image, upon receiving confirmation the node received the update image, transmitting a switchover command to the node to cause the node to switch from its primary image to the update image, and confirming the switching of the image of the node.

16 Claims, 7 Drawing Sheets

(56) References Cited

U.S. PATENT DOCUMENTS

| | | | |
|---|---|---|---|
| 2005/0091511 A1* | 4/2005 | Nave | G06F 8/61 713/185 |
| 2006/0031815 A1* | 2/2006 | Bhagia | G06F 8/61 717/106 |
| 2006/0174055 A1* | 8/2006 | Flynn | G06F 9/4406 711/100 |
| 2006/0218545 A1* | 9/2006 | Taguchi | G06F 8/67 717/168 |
| 2007/0169080 A1 | 7/2007 | Friedman | |
| 2008/0259844 A1 | 10/2008 | Richeson et al. | |
| 2010/0175062 A1* | 7/2010 | Kim | G06F 8/65 717/173 |
| 2011/0126192 A1* | 5/2011 | Frost | G06F 8/61 717/178 |
| 2011/0314107 A1* | 12/2011 | Garcia | H04L 67/02 709/206 |
| 2011/0320794 A1 | 12/2011 | Yang et al. | |
| 2012/0102478 A1 | 4/2012 | Jeong | |
| 2013/0185563 A1 | 7/2013 | Djabarov et al. | |
| 2013/0315235 A1* | 11/2013 | Foo | H04L 67/06 370/389 |
| 2014/0033189 A1 | 1/2014 | Buswell | |
| 2014/0156742 A1* | 6/2014 | Liu | H04L 67/42 709/203 |
| 2014/0317611 A1* | 10/2014 | Wojcik | G06F 8/71 717/168 |
| 2014/0376405 A1* | 12/2014 | Erickson | H04W 52/0212 370/254 |
| 2015/0046921 A1* | 2/2015 | Allen | G06F 9/4406 718/1 |
| 2015/0046922 A1* | 2/2015 | Allen | G06F 9/45558 718/1 |
| 2015/0128121 A1* | 5/2015 | Garcia | G06F 8/65 717/170 |

* cited by examiner

METHOD AND SYSTEM OF PROCESSING AN IMAGE UPGRADE

REFERENCE TO RELATED APPLICATION

This application claims priority to U.S. Provisional Application No. 62/098,998, filed Dec. 31, 2014.

FIELD

The various embodiments described herein relate to processing an image update.

BACKGROUND

Processing nodes at times support a capability to store a plurality of images wherein one image is active at time. At times, one or more of these images need updating.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described. In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Detailed below are embodiments of systems, methods, and apparatuses for upgrading an image on a target node. An image is an application, a system image, a digital signal processor (DSP) image, a data file, or some combined form of these. Throughout this description the transferred data is referred to as an image, whether it is an image or data.

Figure 1:
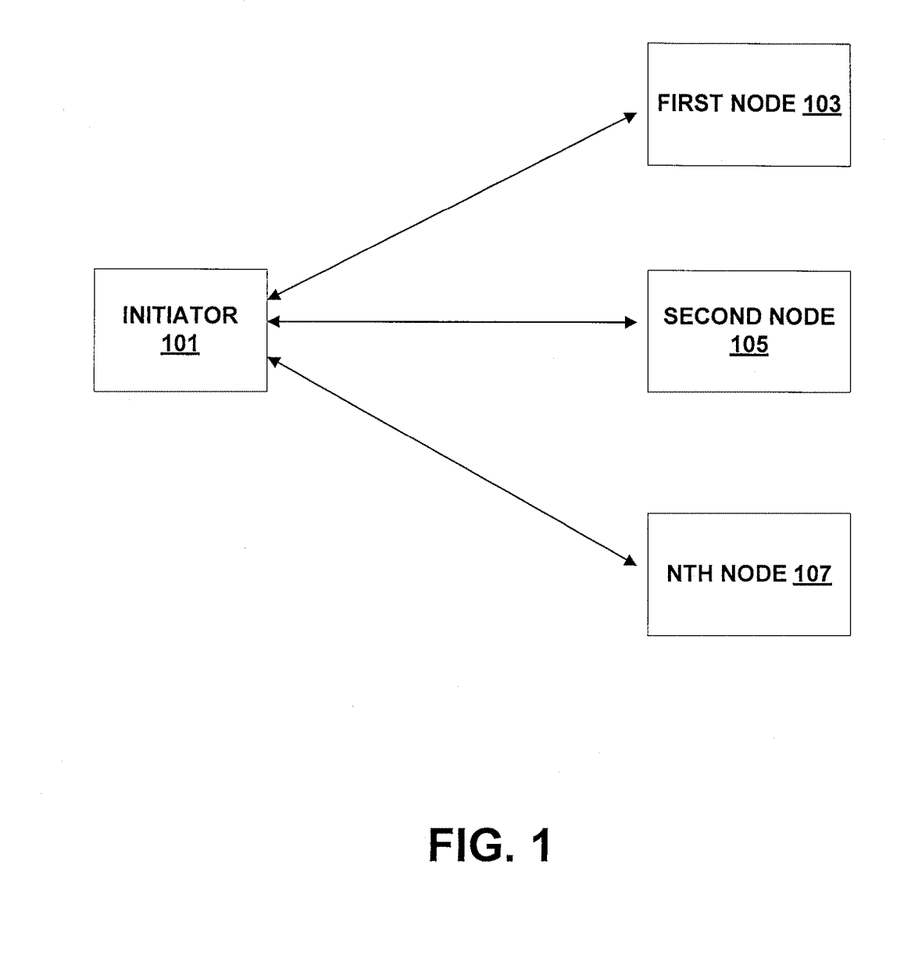
FIG. 1 illustrates an exemplary network featuring three nodes with each node updateable by an initiator.
Figure 7:
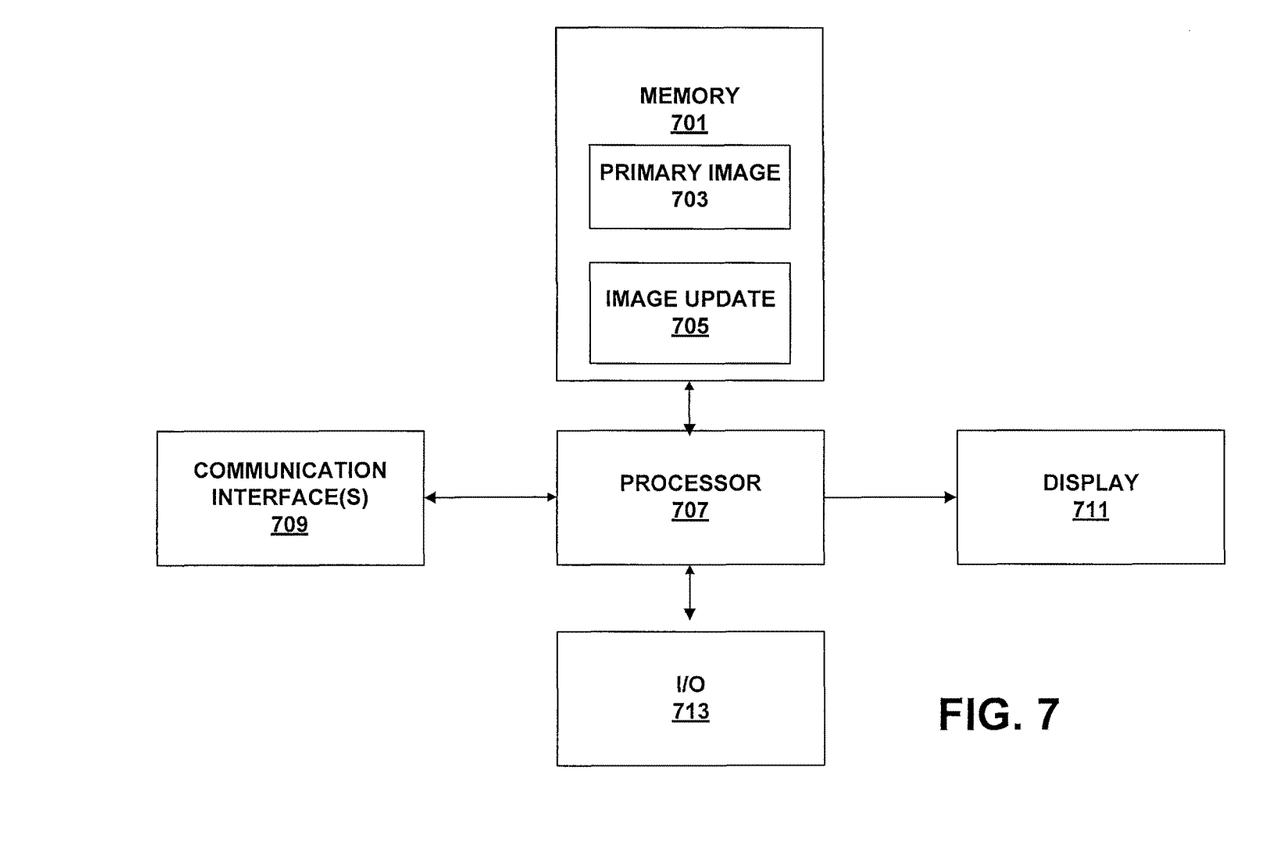
FIG. 7 illustrates, in block diagram form, an exemplary processing system such as a target node or an initiator.

FIG. 1 illustrates an exemplary network featuring three nodes 103, 105, and 107 with each node updateable by an initiator 101 via image update(s) 109, 111, and 113 that the initiator 101 provides. While not illustrated in this figure, each node executes on a processor an image stored in its local memory (as shown in FIG. 7).

Each node (also known as a target) is a logically addressable unit. In some embodiments, a node is a physical node on the network addressable through the node's logical address. In other embodiments, each physical node contains multiple nodes (also known as logical nodes).

In some embodiments, an initiator 101 is a physical node on the network. For example, this physical node may be a provisioning server, a node, a logical node, etc. This initiator 101 allocates and assigns unique logical addresses to nodes o 103, 105, and 107n the network instead of having the nodes 103, 105, and 107 assign addresses automatically to themselves, and also initiates an image update method to each participating node. Initiator 101 sends image update(s) 109, 111, and 113 to each node 103, 105, and 107.

Nodes 103, 105, and 107 may be added to, or removed from, the network. An initiator 101 will send an image update method to other nodes and may automatically assign a unique address to the other nodes that accept this image. Accepting the image update allows the initiator 101 to activate an update for the other nodes 103, 105, and 107 and ensures that the other nodes 103, 105, and 107 are ready for the update.

Each image transfer includes communicating an image type and image subtype to the target. This is conveyed at the start of the transfer on the assumption that the target may set up for the transfer differently depending on the image type and sub-type.

An image type might be a system image, application, DSP image, or akin to a zip file which is a combination of these. It could also be an image destined for the control processor or one destined for an attached host processor. To allow for various scenarios including fast fallback to an old image or switchover of multiple dependent images simultaneously, images are given unique IDs and the transfer and switchover are treated as potentially independent, decoupled events.

The multiple image model supports having a primary and secondary image of each type. The idea is that one can choose to activate a secondary image without deleting the primary so that switching back to the primary is a fast operation.

The multiple image mechanism detailed is intentionally simpler than a general purpose FTP mechanism and thus does not replace such functionality if needed.

Multicasting is supported by allowing the image itself to be multicast or broadcast. The initiation of the transfer contains a session number, as does each image packet. Image packets also contain packet numbers. Nodes not involved in this transfer discard multicasted packets addressed to them. In the event a target misses some of the packets, embodiments detailed below allow a target to state which packets were missed so those can be resent.

With some types of security, all messages can be authenticated, encrypted and protected from replay. In scenarios where that is not possible, the individual packets themselves are multicast but it will not be practical to use acknowledged service to authenticate each one. Instead, the image is protected with a digest. The desired checksum is provided securely as part of the validation and the node will refuse to accept the image if the actual digest does not match.

The digest can be MD5 or SHA-256 and the data is salted. Note that while MD5 has been deprecated in modern security systems, it is allowed here for several reasons. First, it is much faster than SHA-256. On constrained systems, the time to compute SHA-256 over a large image can be long enough that any efficiency gained from multicasting the image are lost. Second, it is deemed acceptable because the salt and MD5 checksum are not revealed to a party attempting to default the security measures until after the image has been transferred so there is no way for him to leverage MD5 weaknesses.

The process detailed below will try repeatedly to get both the control packets and the data packets through. The targets themselves are capable of having the transfer take place over very long periods of time, perhaps days or weeks. However, it is not envisioned at this time that the initial users of this protocol will have this kind of patience.

It should be possible for a target to successfully update even if it power cycles in the middle of the process. This mostly impacts the targets in that they need to use persistent memory to track the state of the transfer, not to mention the image itself.

A power failure in an initiating node should at worst cause eventual termination of the process. It should be extremely unlikely that resuming or re-initiating a transfer after a power cycle would result in a corrupted image in a target.

The initiator must allow for targets to take a reasonable amount of time to initiate or complete the update. Preparing for an update may require long steps like erasing flash. Completing an update may take similarly long steps like computing checksums or transferring an image from one part of flash to another.

Another aspect of tolerance is accepting that not all nodes will be of equal capability. For example, the multicast packets should be sent using the size that works for all the targets. Targets can negotiate a smaller packet size than the initiator initially attempts to use.

The target is allowed to send a failing response at various points during the update process. Unique error codes allow the rejecter to provide a reason for the rejection. Optional additional data (target specific) can be provided as well for debugging. When a rejection occurs, it is up to the initiator to determine how to proceed, particularly in the case of a multicast update. Options include aborting the update for just those parties that reject the update or to abort the entire update for all parties. Note that in some cases the latter may not be practical. For example, if the rejection occurs during the switchover, then it may be too late to abort as some targets may have already switched over at the time of the rejection.

If a target rejects an image, it is up to that target to do any necessary cleanup such as deleting the image.

When switching over, the switchover can be done either with configuration and persistent data preserved or with it lost. It is up to the initiator to know which to request and whether it is safe to request a switchover with these items preserved. It is outside the scope of this document to state how the initiator can do this. One potential path is to create an MD5 checksum over the interface definition and another over the persistent data definition and request preservation only if the old and new images have the same checksums.

Figure 2:
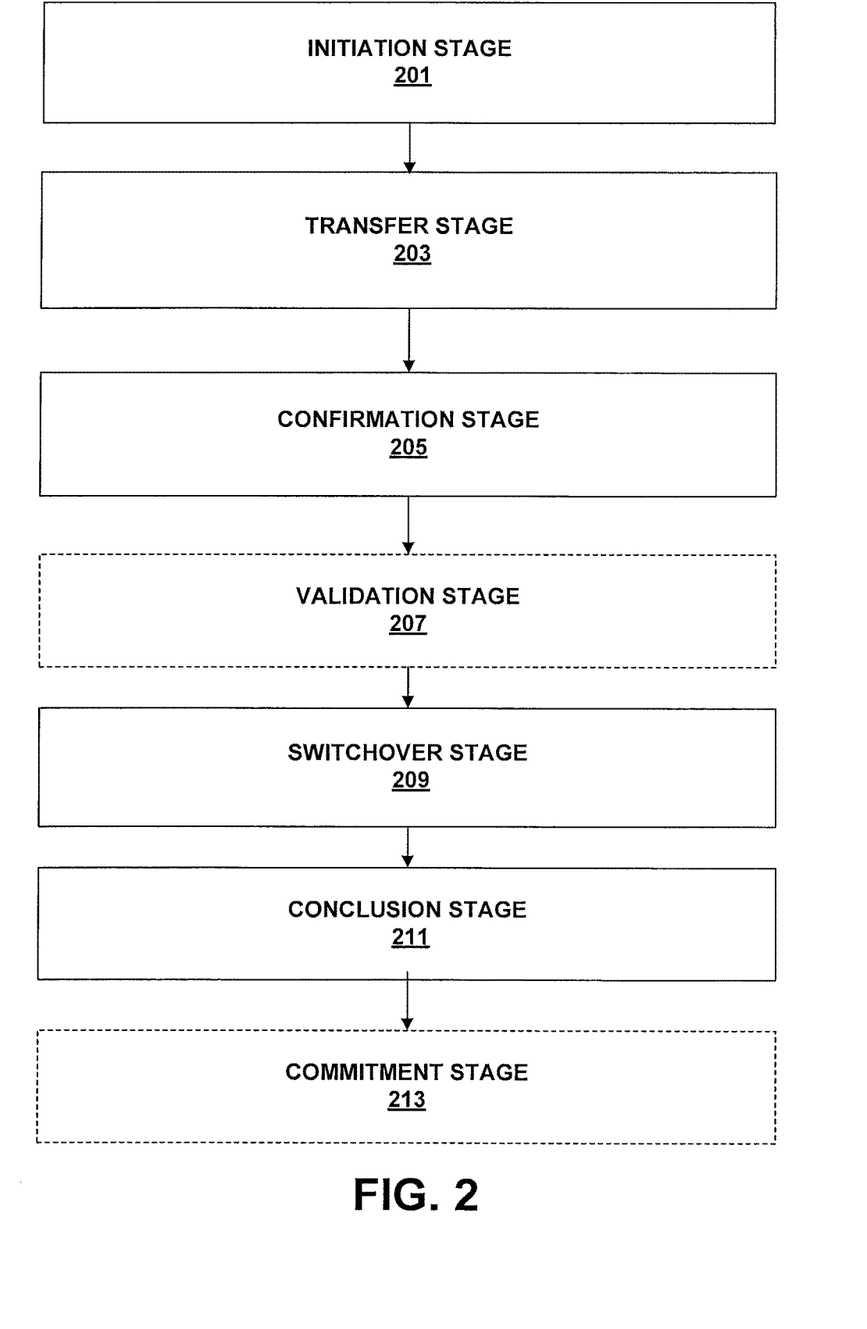
FIG. 2 illustrates an embodiment of a method for updating an image on a target node.

FIG. 2 illustrates an embodiment of a method for updating an image on a target node. This illustration details actions that occur between an initiator and a target node during various stages. Descriptions of embodiments of some stages of this method from a particular node's prospective are detailed in later figures.

At 201, an initiation stage is performed. In this stage, a unicast exchange with each update candidate (target node) is made. This activates the update and ensures the target is ready for an update. For example, initiator 101 initiates image update with node 103. In some embodiments, initiation is performed by conducting a request and response sequence with each target. Typically, the request includes the type and subtype of the image, the MD5 checksum of the image, a session number to be used during the transfer, the number of image packets (referred to as PacketCount) to be sent and the size of each packet. In some embodiments, the product of the number of packets and the packet size is less than 2^24.

An exemplary request message format is detailed herein. However, before defining the exemplary format for this message and other messages, a common notion of an image identifier is introduced. This identifier is defined as:

| ImageIdentifier: | |
|---|---|
| Image Type | An 8-bit image type (see literals below) |
| Image Subtype | An 8-bit image subtype (image type dependent) |
| Image Instance | An 8-byte number that specifies the image within this scope |
| Exemplary Image Types: | |
| 0x00 | Control processor system image |
| 0x01 | Control processor application |
| 0x02 | Control processor DSP image |
| 0x03 | Control processor data image |
| 0x80 | Host processor system image |
| 0x81 | Host processor application |
| 0x82 | Host processor DSP image |
| 0x83 | Host processor data image |
| 0x84 | Host processor combined image |
| 0xC0-0xFF | Host specific image types |

For example, an identifier might be 00/00/0000000000210109 which identifies a version 21.01.09 system image. Or, an identifier might be 01/00/800001345A0C0400 which identifies an application with a particular program ID. Of course, other types or different notations may be used.

An image initiate request message includes the following according to an embodiment. Of course, sizes of the session number, packet size, etc. may be different depending upon the embodiment.

| | |
|---|---|
| Code | 0x60 |
| Subcode | 0x1C |
| Session Number | A 32-bit session number (used in all transfer messages) |
| ImageIdentifier | The 10-byte image identifier - see above |
| Packet Size | A 16-bit packet size in bytes |
| Packet Count | A 16-bit packet count |
| Image Size | A 32-bit image size in bytes |
| Image Header | The first 16 bytes of the image |

The target can respond with one of several different responses, including, but not limited to, success, a request for a smaller packet size, rejection, or tentative success. Tentative success means that the target is not ready for the transfer to begin. Subsequent requests of the same transfer should eventually succeed. A response containing a request for a smaller packet size includes the maximum packet size that the target can support. The initiator is advised not to exceed this amount. In some embodiments, a target need not track session numbers by source address. That is, the target can assume that only one transfer could be ongoing at any given time. If multiple initiators intend to update images with intersecting targets, then they should do so at different times and agree in advance how to partition the session number space.

If a target has a transfer in progress and receives an initiation, that initiation will terminate the previous in-progress transfer.

The initiation process includes providing the target with the first 16 bytes of the image. The assumption is that the 16 bytes of the image can contain sufficient image for the target to do compatibility validation. This includes making sure that the image is intended to be run on this target, was linked for the appropriate firmware that is running on the target and is built for the hardware that the target contains.

The initiation process also lets the initiator know what security methods are possible so the right one can be selected.

An image initiate response message includes the following according to an embodiment. Of course, sizes of the packet size, etc. may be different depending upon the embodiment.

| | |
|---|---|
| Code | 0x20 |
| Subcode | 0x1C |
| Result Code | An 8-bit result code (see literals below) |
| Action Time | 16-bit estimate of how long this action will take in seconds. |
| Packet Size | A 16-bit packet size in bytes (0 if size is fine) |
| Packet Spacing | A 16-bit number of milliseconds for Image Transfer packet spacing (measured packet start to packet start) |
| Digest Algorithms | A bitmask of the possible digest algorithms to use: (bit 0 = MD5, bit 1 = SHA256) |

Exemplary Result Codes

| | |
|---|---|
| 0x00 | Success |
| 0x01 | Results still pending - try again later (see Action Time) |
| 0x02 | Process denied due to packet size too large (required size supplied) |
| 0x03 | Invalid image type |
| 0x04 | Invalid image subtype |
| 0x05 | Image incompatible - versions incompatible |
| 0x06 | Image incompatible - model incompatible |

The image size is determined by the PacketSize*PacketCount. If the packet size is negotiated down, then the target will not know this until it receives its first packet. At that point it must re-compute the Packet-Count as follows:

ActualPacketCount=OriginalPacketSize* OriginalPacketCount/ActualPacketSize

Furthermore, if the actual packet size is smaller than the original, the initiator must sent ActualPacketCount packets, even if the last packets might be viewed as filler.

In some embodiments, when the image header is all zeroes, then this means that no compatibility checking is to be done. It is up to the target whether to treat the image header as part of the image or separate from the image. For the initiator, the image is always broken into the first 16 bytes sent with the image initiate request and then the remainder sent as Image transfer packets.

Typically, the initiator should use the strongest digest algorithm that is supported by both parties. However, the target does not require this.

A transfer stage occurs at 203. In this stage, the image is cast from the initiator to one or more nodes and there are typically no responses from the target. Transfer of the image may be done using unicast, multicast, or broadcast addressing. Each transfer packet contains the image session number provided in the initiation request, a packet number (0 . . . PacketCount-1), and an image chunk. It is assumed that the receiver will deduce the chunk size from the packet length. The chunk size may be smaller than the size specified in the initiation stage 201. This is because the initiator does not cycle back to re-inform all targets of a reduced packet size in the event a target rejects the currently offered setting. A target learns the chunk size from the first received transfer packet.

During transfer, in some embodiments, a target can tolerate holes in the packet sequence. This means that the target is capable of random access writes to the image (or use some equivalent means of tracking all the chunks). The target also records which packets are lost for later reporting.

In some embodiments, an unacknowledged service is used and there is the potential for a large amount of buffering somewhere in the network. It is possible that after sending the last of the transfer messages, that network nodes appear non-responsive during the confirmation stage 205. As such, in some embodiments, after every N transfer frames, a single node (any will do) is pinged during transfer. Waiting for the ping response will force the transfer stage 203 to slow down and not overly stress any intermediate buffering. The ping should use the smallest request and response size possible for best performance.

An image transfer message includes the following according to an embodiment. Of course, sizes of the session number, packet size, etc. may be different depending upon the embodiment.

| | |
|---|---|
| Code | 0x60 |
| Subcode | 0x1D |
| Session Number | A 32-bit session number |
| Packet Number | A 16-bit packet number (0 . . . ActualPacketCount - 1) |
| Packet Data | The remainder of the data is the image data - this starts with offset 16 as the first 16 bytes are sent in the Image Initiate message. |

A confirmation stage occurs at 205. During this state each target candidate is checked to see if it received the entire image. If not, the transfer stage 203 is repeated, but typically only for those parts of the image that were missed. During confirmation, a unicast request and response sequence is made with each target that specifies the session number in the request and a response that reports which packets were missed. In a highly lossy situation, it might not be possible to report all packets that were missed in a single response. In this case, the initiator will re-send those that were reported and then repeat the confirmation. It is asserted that even if all packets that were lost cannot be reported, the process will converge. Once a target confirms successful receipt of the image, it will discard any further transfer packets for that image. That way, once it is confirmed, it is not necessary to confirm it again. In general, if multicast is being used during the initial transfer then during the re-send process, multicast also can be used again.

In some embodiments, during the confirmation stage the initiator repeatedly resends until the first target reports success and then moves on to the next target. With this approach, it is asserted that most targets will report successful receipt of all packets.

In addition to detecting missing packets, during the confirmation stage 207 the target detects corrupted (or tampered with) images. That is, the target reports that all packets were successfully received if the actual checksum matches that provided during initiation. If it doesn't, the target returns an error stating that there was a checksum mismatch. The target can also respond with an error saying that the confirmation is pending (e.g., the target is still computing the checksum) or that the image is simply not a viable image (for example, the image is a downgrade and the target doesn't support downgrade)

Once the image is confirmed, the above stages can be repeated for additional images.

An image confirm request includes the following according to an embodiment. Of course, sizes of the result code, packet count, etc. may be different depending upon the embodiment.

| Code | 0x60 |
|---|---|
| Subcode | 0x1E |
| Session Number | A 32-bit session number (same as ImageInitiate::SessionNumber) |

An image confirm response message includes the following according to an embodiment. Of course, sizes of the result code, packet count, etc. may be different depending upon the embodiment.

| Code | 0x20 |
|---|---|
| Subcode | 0x1E |
| Result Code | An 8-bit result code (see literals below) |
| Packet Count | An 8-bit count of missed packets listed (for result code 2 only) |
| Packet Array | An array of ImageConfirm::PacketCount 16-bit packet numbers |

Exemplary Result Codes:

| 0x00 | Success |
|---|---|
| 0x01 | Success, but still pending |
| 0x02 | Packets missed |
| 0x03 | Image not viable |

In some embodiments, a validation stage occurs at 207. Typically, this stage is used when there is not a secure means for doing multicast. It is used to validate the image integrity. It can also be used to validate that the image is valid in other ways such as that it has a proper digital signature generated by a known good image creator (this is often required for metrology nodes used by public utilities). This stage comprises a request and response sequence. The initiator provides a session number, digest type, hash salt, and a digest to the target. The target then uses this information to provide a response including a result code by comparing the received digest to the stored digest and applying the digest (hash) to the image.

If the image is multicast and the multicasts are not secure, then the image should be validated to ensure it has not been tampered with. This stage can also be used to confirm that the image has no other issues such as incompatibility or invalid digital signature.

An image validate request message includes the following according to an embodiment. Of course, sizes of the result code, packet count, etc. may be different depending upon the embodiment.

| Code | 0x60 |
|---|---|
| Subcode | 0x1F |
| Session Number | A 32-bit session number (same as ImageInitiate::SessionNumber) |
| Digest Type | An 8-bit digest type |
| Salt | N 8-bit random bytes fed into the hash prior to the image itself |
| Digest | N 8-bit digest bytes |

An image validate response includes the following according to an embodiment. Of course, sizes of the result code, etc. may be different depending upon the embodiment.

| Code | 0x20 |
|---|---|
| Subcode | 0x1F |
| Result Code | An 8-bit result code (see literals below) |
| Action Time | 16-bit estimate of how long this action will take in seconds. |

Exemplary Digest Type:

| 0x00 | None - no digest check to be done |
|---|---|
| 0x01 | MD5 - digest is MD5 (N thus equals 16) |
| 0x02 | SHA-256 - digest is SHA-256 (N thus equals 32) |

Exemplary Result Codes:

| 0x00 | Success |
|---|---|
| 0x01 | Results still pending - try again later (see Action Time) |
| 0x02 | Image rejected - versions incompatible |
| 0x03 | Image rejected - model incompatible |
| 0x04 | Image rejected - invalid digest |
| 0x05 | Image rejected - invalid digital signature |
| 0x06 | Requested rejected - digest type not supported |
| 0x07 | Image rejected - other |

A switchover stage occurs at 209 to initiate a switchover from an existing image to the received image at each candidate. Once all targets have been confirmed and all desired images have been transferred, the initiator conducts a unicast switchover request and response sequence with each target. The request tells the target to switch over to the new image. Optionally, the initiator can tell the target to switch over at some future time. It is assumed that targets do not necessarily have real-time clocks and thus the switchover time is given as a number of seconds in the future. It is also assumed that initiators will send an appropriate delta time for each target in this case. As time passes during the switchover stage, the delta time would be reduced. It is the responsibility of the initiator to choose a delta time for the first target that is sufficiently far into the future that the last target can also be given a non-zero delta time. The initiator needs to choose a model for the communications success rate that is appropriate for the channel. In some embodiments, a measurement of how long it takes to execute the confirmation stage (excluding the packet transfers) is made and used as a basis for approximating the total switchover stage time.

An image switchover request message includes the following according to an embodiment. Of course, sizes may be different depending upon the embodiment.

| Code | 0x60 |
|---|---|
| Subcode | 0x20 |
| SwitchoverFlags | An 8-bit set of flags (see below) |
| IdentifierCountdown | A 16-bit countdown in seconds until switchover |
| Image Count | An 8-bit number (N) of image identifiers to switch over to |
| ImageIdentifier | N 10-byte image identifiers |

When the countdown is small or zero, it is possible that the target could switchover immediately and thus be unable to report a result of success, especially if retries are required. Therefore, in some embodiments the initiator specifies a countdown of duration commensurate with the typical worst case transaction time to give the response a chance to be returned.

Exemplary switchover flags are as follows:

Secondary Flag (Bit 0)–1=>Image(s) to remain secondary after switchover.

Preserve Config (Bit 1)–1=>Preserve the configuration (network image).

Preserve Persistence (Bit 2)–1=>Preserve persistent data (CPs, etc).

When the configuration is not preserved, then the node will go "unconfigured" after the switchover and is re-commissioned. A target can opt to not support the notion of preserving configuration and persistent data.

An image switchover response message includes the following according to an embodiment. Of course, sizes may be different depending upon the embodiment.

| Code | 0x60 |
|---|---|
| Subcode | 0x20 |
| Result Code | An 8-bit result code (see literals below) |
| Action Time | 16-bit estimate of how long this action will take in seconds. |
| ImageIdentifier | Image that was rejected |
| Rejection Reason | Custom data for debugging a rejection (target specific) |

Note that the target will typically only report the first error it encounters. If there are multiple failures, a subsequent attempt that fails with a different error will result in a different response.

Exemplary Rejection Reasons Responses are:

| Length | 8-bit count of the number of bytes |
|---|---|
| Type | 8-bit type (target specific) |
| Data | "Length" bytes of reason data |

Exemplary Results Codes are:

| 0x00 | Success |
|---|---|
| 0x01 | Image rejected - versions incompatible |

-continued

| 0x02 | Image rejected - model incompatible |
|---|---|
| 0x03 | Switchover rejected - secondary mode not supported |
| 0x04 | Switchover rejected - preservation not supported |
| 0x05 | Image rejected - image not available |
| 0x06 | Image rejected - other |

A conclusion stage occurs at 211. During this stage a check on each candidate that switched over is made. Once the switchover period has transpired, the initiator can issue a request to confirm that the switchover did occur. It is possible for a target to respond that the switchover could not complete at this point. For example, there may be some aspect of the image that causes the target to reject the image that cannot be known until the actual switchover is attempted.

A failure to switchover is atypical and the initiator would generally not attempt to recover from this and an operator would need to intervene (to retry the whole process, use a different image, replace a faulty target, etc.).

The initiator assumes that a target may not be able to respond to this request for some time after a switchover. To help with this, the target responds to a switchover request with the maximum amount of time that it will take to switchover so that the initiator knows how patient to be. The initiator could attempt to check for conclusion more frequently than this worst case time, but it shouldn't declare a failure until that timeout expires without successful conclusion. For a multiple image switchover, the confirmation is done by querying the status of each image separately.

An image conclusion request includes the following according to an embodiment. Of course, sizes may be different depending upon the embodiment.

| Code | 0x60 |
|---|---|
| Subcode | 0x21 |
| Image Identifier | The image for which status is being requested |

An image conclusion response message includes the following according to an embodiment. Of course, sizes may be different depending upon the embodiment.

| Code | 0x60 |
|---|---|
| Subcode | 0x21 |
| Image Status Flags | An 8-bit flags byte (see below) |
| Rejection Code | An 8-bit rejection code (see below |
| Rejection Reason | Custom data for debugging a rejection (target specific) |

Exemplary Image Flags:

Bit 0  1=> Image is accepted; 0=> Image was rejected (see Rejection Code)
Bit 1  1=> Image is the secondary image; 0 =>image is the primary image
Bit 2  1=> Image is currently active; 0 =>image is not currently active Exemplary Rejection Codes:

| 0x00 | N/A |
|---|---|
| 0x01 | Image rejected - versions incompatible |
| 0x02 | Image rejected - model incompatible |
| 0x03 | Switchover rejected - secondary mode not supported |

| | |
|---|---|
| 0x04 | Switchover rejected - preservation not supported |
| 0x05 | Image rejected - other |

Finally, in some embodiments, a commitment stage occurs at 213. In this stage, the switchover version made the primary version by the target. Images might be destined for different parts of the target. For example, some images might be for the control processor and some might be for the host processor. It is up to the stack to process image types it understands but either forward along any of those it does not or not acknowledge them if at the end of the line.

Once the switchover is completed and the new image is found to be satisfactory (based on an arbitrary judgment of the initiator), it can be committed. The process of committing an image will cause the secondary image to become the primary image and thus the pervious primary image can no longer be switched to. A target may also choose to have other properties attached to the primary and secondary image. For example, on platforms with write-protected memory, it is recommended that the primary image be write-protected. The secondary image could also be write-protected but for space reasons this might not be possible.

An image commitment request message includes the following according to an embodiment. Of course, sizes may be different depending upon the embodiment.

| | |
|---|---|
| Code | 0x60 |
| Subcode | 0x22 |
| Image Count | An 8-bit number (N) of image identifiers commit |
| ImageIdentifier | N 10-byte image identifiers |

An image commitment response message includes the following according to an embodiment. Of course, sizes may be different depending upon the embodiment.

| | |
|---|---|
| Code | 0x60 |
| Subcode | 0x22 |
| Result Code | An 8-bit result code (see literals below) |
| Action Time | 16-bit estimate of how long this action will take in seconds. |
| Rejection Reason | Custom data for debugging a rejection (target specific) |

Exemplary Result Codes:

| | |
|---|---|
| 0x00 | Success |
| 0x01 | Results still pending - try again later (see Action Time) |
| 0x02 | Commit failed - image does not exist |
| 0x03 | Commit failed - image is already primary |
| 0x04 | Commit failed - other |

Figure 3:
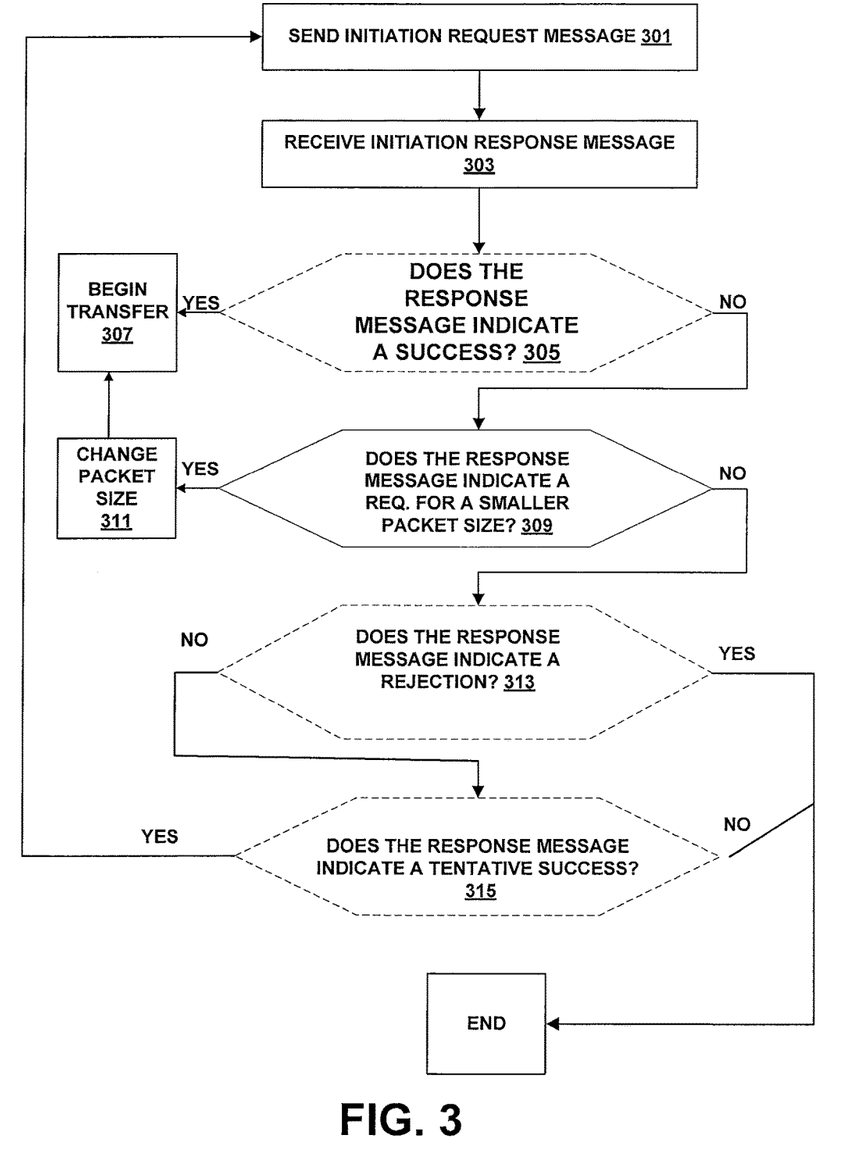
FIG. 3 illustrates an embodiment of an initiation stage performed by an initiator.

FIG. 3 illustrates an embodiment of an initiation stage performed by an initiator. At 301, the initiator sends an initiation request message. An exemplary message of this type was detailed above.

An initiation response message is received at 303. This response message includes an indication of status at the target including if it is a successful initiation, a tentative success, a rejection, or a request for a smaller packet size.

A determination of if the response message indicates success is made at 305. If yes, then the transfer of the image can begin (transfer stage) at 307.

If not, then a determination of if the response message indicates a request for a small packet size is made at 309.

When this is true, the initiator changes the packet size at 311 and begins the transfer process at 307 in some embodiments. In other embodiments, the initiator resends a request message with the new packet size.

If not, then a determination of if the response message indicates a rejection is made at 313. When it does, the process ends and no image update will occur.

If not, then a determination of if the response message indicates tentative success is made at 315. If this is true, the initiator sends an initiation request message at 301. If false, then the process ends and no image update will occur as an undefined response has been received.

Figure 4:
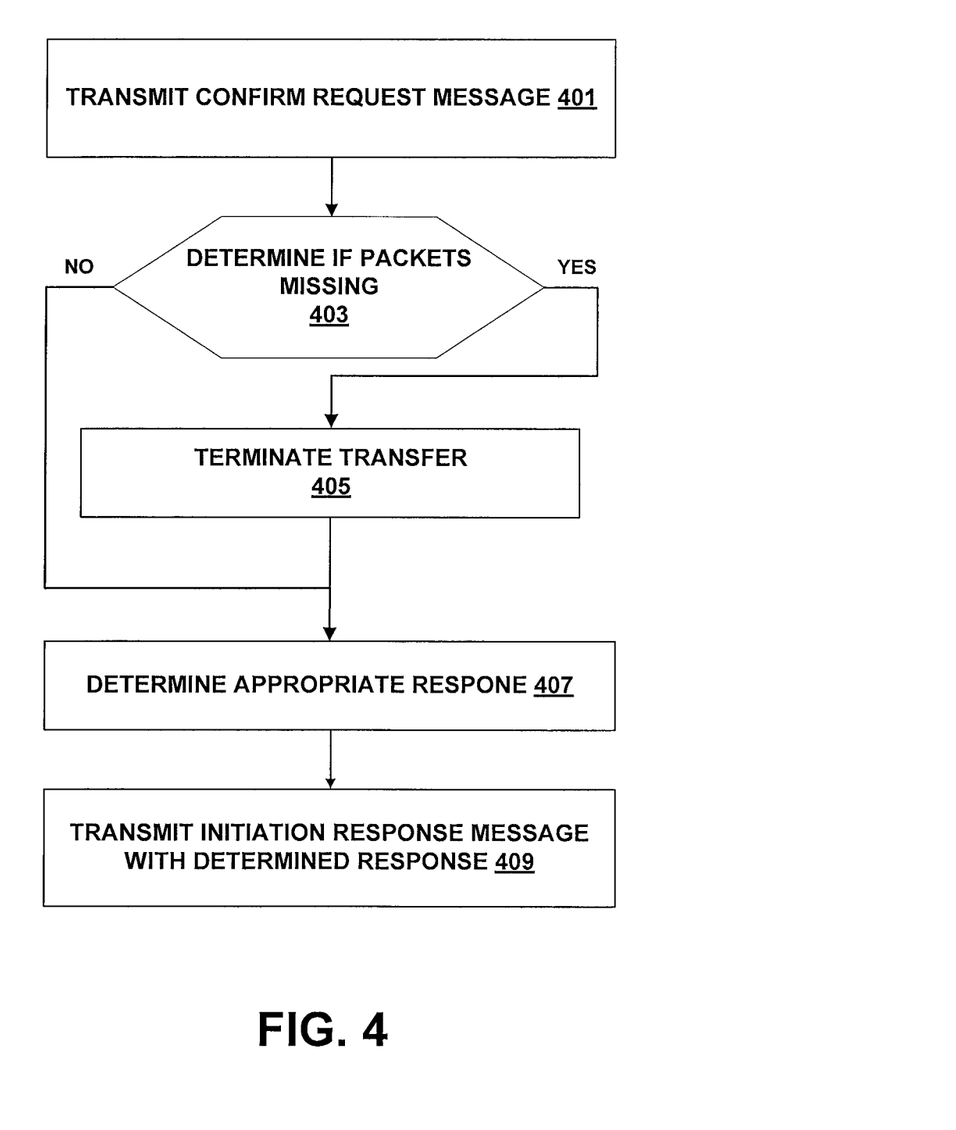
FIG. 4 illustrates an embodiment of an initiation stage performed by a target.

FIG. 4 illustrates an embodiment of an initiation stage performed by a target. At 401, an initiation request message is received. An example of this message was detailed above. A determination of if there was an image transfer already in progress is made at 403. If there is one, then that transfer is terminated at 405.

After the transfer is terminated, or if there was no existing transfer, an appropriate response to the request is made at 407. This includes looking at the first few bytes of the image that was included in the request for compatibility (if not compatible, a rejection is the appropriate request), determining if a smaller packet size is needed (a smaller packet response is appropriate) based on the data of the request, if the target is ready (success), if the target will be ready later (tentative success).

An initiation response message with the determined response is transmitted to the initiator at 409.

Figure 5:
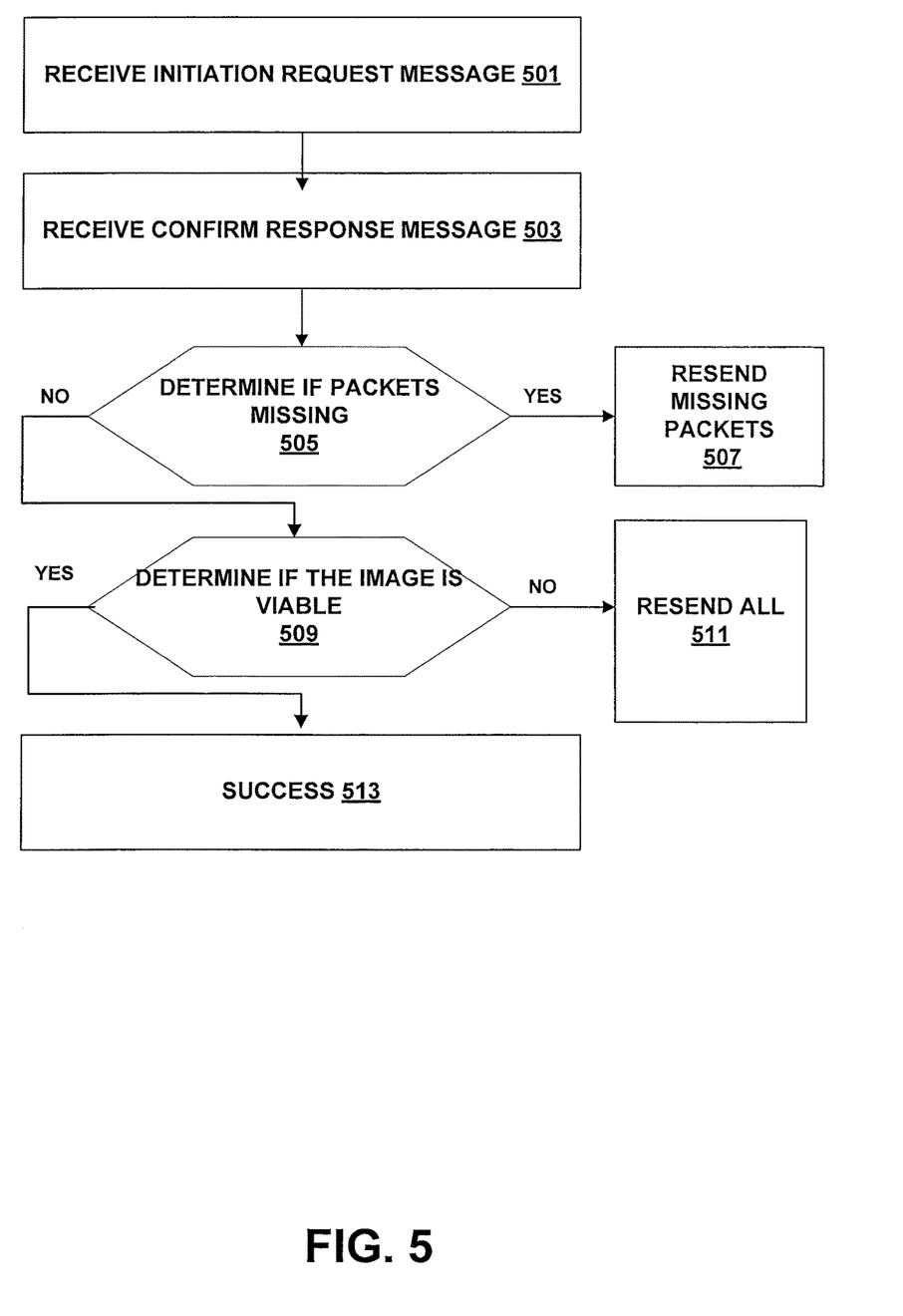
FIG. 5 illustrates an embodiment of a confirmation stage performed by an initiator.

FIG. 5 illustrates an embodiment of a confirmation stage performed by an initiator. A confirm request message is transmitted at 501. An exemplary message of this type was detailed above.

A confirm response message is received at 503. This response message includes an indication of status the received image.

A determination of if there are missing packets is made at 505. This is indicated in the response message. If yes, then the missing packets are resent at 507.

If not, then a determination of if the image is viable is made at 509. Again, this is indicated in the message. When the image is not viable (corrupt for some reason), then in some embodiments all of the image packets are retransmitted at 511. In other embodiments, the image update process is halted.

When the image is viable, then a successful transmission has occurred at 513.

Figure 6:
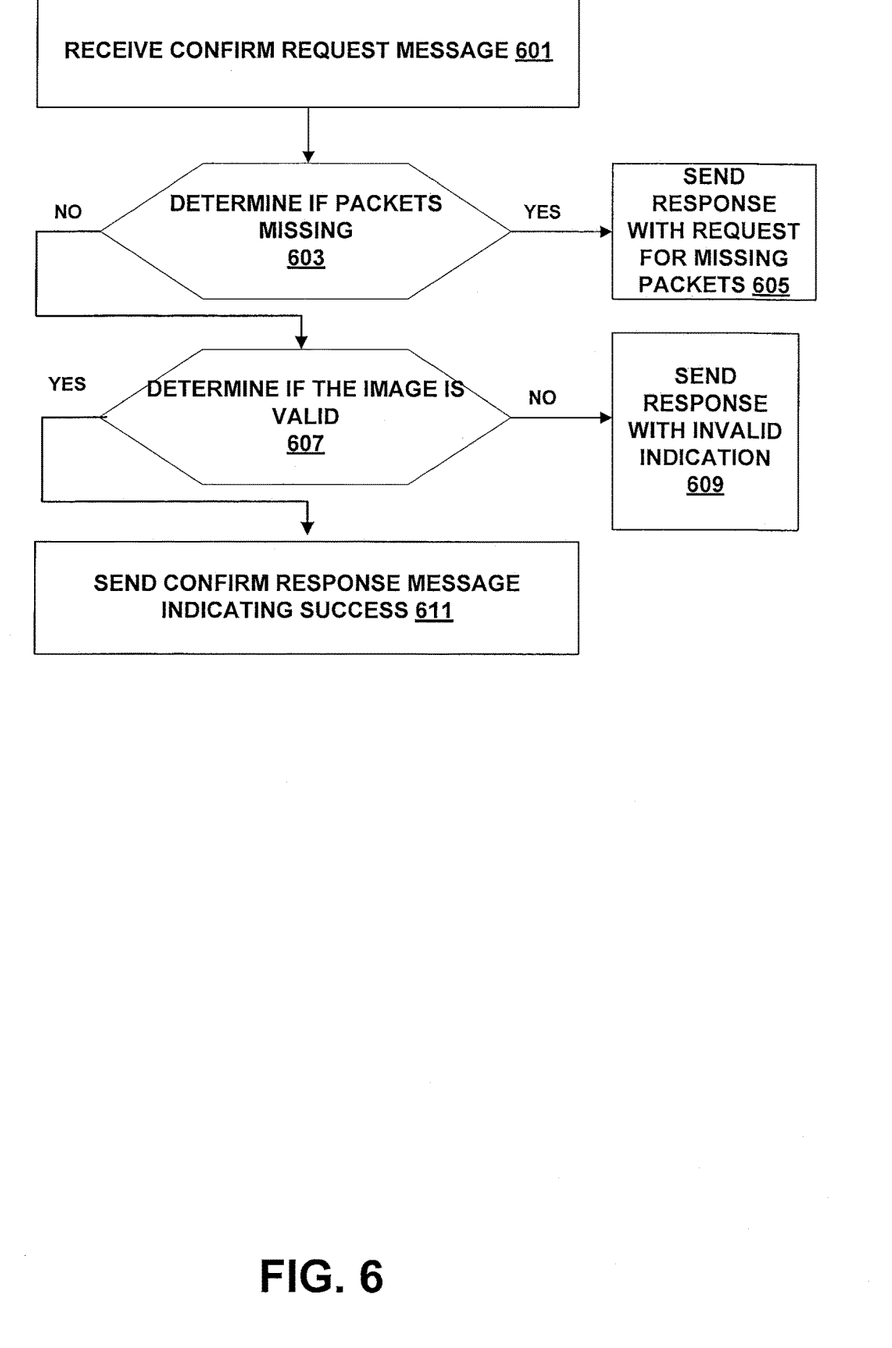
FIG. 6 illustrates an embodiment of a confirmation stage performed by a target.

FIG. 6 illustrates an embodiment of a confirmation stage performed by a target. A confirm request message is received at 601. An exemplary message of this type was detailed above.

A determination of if there are missing packets is made at 603. If yes, then a confirm response message with a missing packets request is transmitted to the initiator at 605.

If not, then a determination of if the image is valid is made at 607. Typically, this is done by performing a hash function and comparing the resultant hash value with an expected value as provided by the initiator. When the image is not valid (corrupt for some reason), then a confirm response message indicating invalidity is transmitted at 609.

When the image is valid, then a successful transmission has occurred at 511. When the image is valid and not packets are missing, a confirm response message is transmitted at 511 indicating success.

FIG. 7 illustrates, in block diagram form, an exemplary processing system 700 such as a target node or an initiator. Data processing system 700 includes one or more processors (e.g., central processor unit, microcontroller, etc.) 707 and connected system components (e.g., multiple connected chips). Alternatively, data processing system 700 is a system on a chip.

Data processing system 700 includes memory 701, which is coupled to microprocessor(s) 707. Memory 701 may be used for storing data, metadata, a primary image 703, update images 705, and programs for execution by the microprocessor(s) 707. In some embodiments, update images 705 may be destined for the memory 701 and other update images 705 destined for microprocessor(s) 707. For example, memory 701 may include one or more of the data stores and/or may store modules described herein. Memory 701 stores instructions which when executed perform embodiments of the methods detailed above. Memory 701 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 701 may be internal or distributed memory.

Data processing system 700 includes network and port interfaces 709, such as a port, connector for a dock, or a connector for a USB interface, FireWire, Thunderbolt, Ethernet, Fibre Channel, powerline communication (PLC), etc. to connect the system 700 with another node, external component, or a network. Exemplary network and port interfaces 709 also include wireless transceivers, such as an IEEE 802.11 transceiver, an infrared transceiver, a Bluetooth transceiver, a wireless cellular telephony transceiver (e.g., 2G, 3G, 4G, etc.), or another wireless protocol to connect data processing system 1000 with another node, external component, or a network and receive stored instructions, data, tokens, etc.

Data processing system 700 also includes display controller and display node 711 and one or more input or output ("I/O") nodes and interfaces 713. Display controller and display node 711 provides a visual user interface for the user. I/O nodes 713 allow a user to provide input to, receive output from, and otherwise transfer data to and from the system. I/O nodes 713 may include a mouse, keypad or a keyboard, a touch panel or a multi-touch input panel, camera, optical scanner, audio input/output (e.g., microphone and/or a speaker), other known I/O nodes or a combination of such I/O nodes.

It will be appreciated that one or more buses may be used to interconnect the various components shown in FIG. 7.

Data processing system 700 is an exemplary representation of one or more of the nodes described above. Data processing system 700 may be a personal computer, tablet-style node, a personal digital assistant (PDA), a cellular telephone with PDA-like functionality, a Wi-Fi based telephone, a handheld computer which includes a cellular telephone, a media player, an entertainment system, or nodes which combine aspects or functions of these nodes, such as a media player combined with a PDA and a cellular telephone in one node. In other embodiments, data processing system 700 may be a network computer, server, or an embedded processing node within another node or consumer electronic product. As used herein, the terms computer, node, system, processing system, processing node, and "apparatus comprising a processing node" may be used interchangeably with data processing system 700 and include the above-listed exemplary embodiments.

Additional components, not shown, may also be part of data processing system 700, and, in certain embodiments, fewer components than that shown in FIG. 10 may also be used in data processing system 700. It will be apparent from this description that aspects of the inventions may be embodied, at least in part, in software. That is, the computer-implemented method(s) may be carried out in a computer system or other data processing system 700 in response to its processor or processing system 707 executing sequences of instructions contained in a memory, such as memory 701 or other non-transitory machine-readable storage medium. The software may further be transmitted or received over a network (not shown) via network interface node 709. In various embodiments, hardwired circuitry may be used in combination with the software instructions to implement the present embodiments. Thus, the techniques are not limited to any specific combination of hardware circuitry and software, or to any particular source for the instructions executed by the data processing system.

There are several use cases that take advantage of the image update process detailed above. For example, in an efficient application update scenario, the initiator updates multiple targets using a multicast update. Once the image is transferred, each target is given a time in the future to switch over their primary image. If the application is interface compatible with the previous one, then the initiator requests a preserved configuration switchover and no re-commission is required. When the switchover time arrives, all targets switch over at the same time. The initiator can then check the status of each image to make sure it successfully became the active image.

In a dependent update scenario, a target requires a new application that is dependent on a new system image feature. The target must be loaded with both the system image and the application and then be instructed to switch over both at the same time. This way the update can occur with minimal interruption.

In a trial update scenario, the initiator is concerned about the complexity of the application change and wants to have an insurance policy in case there is a problem. So, the initiator transfers the new application and switches over to it but leaves it running as the secondary image. The initiator then decides a day later that the new application is flawed and switches back to the primary image with a simple switchover request rather than requiring a reload of the applications. A proper application is then devised and at that point it is loaded and switched into, again as the secondary image. At some point in the future, the initiator decides that the latest application is now the correct application to run and commits the new application. At this point reverting to the original image requires a reload of that image.

Different embodiments of the invention may be implemented using different combinations of software, firmware, and/or hardware. Thus, the techniques shown in the figures can be implemented using code and data stored and executed on one or more electronic nodes (e.g., an end system, a network element). Such electronic nodes store and communicate (internally and/or with other electronic nodes over a network) code and data using computer-readable media, such as non-transitory computer-readable storage media (e.g., magnetic disks; optical disks; random access memory; read only memory; flash memory nodes; phase-change memory) and transitory computer-readable transmission media (e.g., electrical, optical, acoustical or other form of propagated signals—such as carrier waves, infrared signals, digital signals). In addition, such electronic nodes typically include a set of one or more processors coupled to one or more other components, such as one or more storage nodes (non-transitory machine-readable storage media), user input/output nodes (e.g., a keyboard, a touchscreen, and/or a display), and network connections. The coupling of the set of processors and other components is typically through one or more busses and bridges (also termed as bus controllers). Thus, the storage node of a given electronic node typically stores code and/or data for execution on the set of one or more processors of that electronic node.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method comprising:
    initiating an image update process with a node by transmitting an initiation request message to the node, the initiation request message including a type of the image, a subtype of the image, an image instance number, a session number, a packet size, a packet count, an image size, and an image header, the image header is the first 16 bytes of the image and contains a sufficient amount of the image for compatibility validation, wherein the type of the image, the subtype of the image, and the image instance number are included in an image identifier field that is 10 bytes in size;
    receiving a response message to the initiation request message, the response message including a result code and a digest algorithm to use for transmitting the image;
    transmitting an update image to the node;
    transmitting a confirmation request to determine the node received the update image;
    upon receiving confirmation, the node received the update image, transmitting a switchover command to the node to cause the node to switch from its primary image to the update image; and
    confirming the switching of the image of the node.

2. The method of claim 1, wherein the update image transmitting is a packetized transmission wherein a size of each packet is determined by the node.

3. The method of claim 2, wherein each packet includes a session number, packet number, and an image chunk.

4. The method of claim 1, wherein the image is one of a system image, data, or application.

5. The method of claim 1, initiating an image update with a node further comprises:
    receiving an initiation response message from the node to indicate a status of the initiation.

6. The method of claim 1, wherein confirming the switching of the image of the node comprises:
    transmitting a unicast confirm request message including a session number; and
    receiving an indication from the node of if any packets were missed.

7. The method of claim 6, further comprising:
    re-transmitting any packet that was missed.

8. The method of claim 1, further comprising:
    validating the image by sending a validate request to the node; and
    receiving an indication from the node of validity of the image.

9. The method of claim 1, further comprising:
    sending a commitment request message to the node for the node to commit the image and confirm commitment.

10. The method of claim 1, wherein the image type is one of a:
    control processor system image,
    control processor application,
    control processor digital signal processor (DSP) image,
    control processor data image,
    host processor system image,
    host processor application,
    host processor DSP image,
    host processor data image, and
    host processor combine image.

11. The method of claim 1, wherein the image type is identified using an 8-bit value.

12. The method of claim 1, wherein the header is set to all zeros indicating that no compatibility checking is to be done.

13. The method of claim 1, wherein the image instance number is an 8-byte number that specifies the image.

14. The method of claim 1, wherein the result code is one of success, results still pending, invalid image type, invalid image type, invalid image subtype, image incompatible.

15. The method of claim 1, wherein the digest algorithm is indicated in a bit mask.

16. The method of claim 1, wherein the bit mask indicates use of MD5 or SHA256.

* * * * *